United States Patent
Gilkey et al.

(10) Patent No.: US 12,366,405 B2
(45) Date of Patent: Jul. 22, 2025

(54) LIQUID DISPENSER WITH PRECISE DISPENSATION USING A VOICE ASSISTANT

(71) Applicant: Haier US Appliance Solutions, Inc., Wilmington, DE (US)

(72) Inventors: Bradley Nicholas Gilkey, Louisville, KY (US); Stephanos Kyriacou, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 369 days.

(21) Appl. No.: 17/869,859

(22) Filed: Jul. 21, 2022

(65) Prior Publication Data
US 2024/0027127 A1    Jan. 25, 2024

(51) Int. Cl.
F25D 29/00      (2006.01)
F25D 23/12      (2006.01)
G05B 19/042    (2006.01)

(52) U.S. Cl.
CPC ........... *F25D 29/00* (2013.01); *F25D 23/126* (2013.01); *G05B 19/042* (2013.01); *F25D 2700/06* (2013.01); *G05B 2219/2645* (2013.01); *G05B 2219/2654* (2013.01)

(58) Field of Classification Search
None
See application file for complete search history.

(56) References Cited

U.S. PATENT DOCUMENTS

| | | | |
|---|---|---|---|
| 8,109,301 B1 * | 2/2012 | Denise | F25C 5/22 222/113 |
| 10,345,033 B1 | 7/2019 | Thomas et al. | |
| 11,008,207 B2 | 5/2021 | Park | |
| 2015/0336786 A1 * | 11/2015 | Gardner | F24C 7/08 222/1 |
| 2020/0354932 A1 * | 11/2020 | Gunawardena | G10L 15/22 |

FOREIGN PATENT DOCUMENTS

| | | |
|---|---|---|
| CN | 109237863 A | 1/2019 |
| DE | 102019116628 A1 | 11/2020 |

OTHER PUBLICATIONS

ADA Appliances, "GE café™ series cfe28ushss energy star® 27.8 cu. ft. french-door refrigerator with keurig® k-cup® brewing system", 5 pages, Retrieved from internet: https://adaappliances.com/product/ge-cafe-series-cfe28ushss-energy-star-27-8-cu-ft-french-door-refrigerator-with-keurig-k-cup-brewing-system/.

* cited by examiner

*Primary Examiner* — Paul B Yanchus, III
(74) *Attorney, Agent, or Firm* — Dority & Manning, P.A.

(57) ABSTRACT

A refrigerator appliance includes a cabinet defining a chilled chamber; a dispenser provided on the cabinet, the dispenser defining a dispenser recess, the dispenser including a nozzle for dispensing liquid water or ice; a user input provided on the dispenser; and one or more controllers operably connected with the dispenser, the one or more controllers configured to perform an operation. The operation includes receiving a first input signal apart from the appliance, the first input signal including a first requested volume of liquid; storing the first requested volume of liquid within the dispenser; directing an emission of a notification via the user input in response to storing the first requested volume of liquid; and initiating a dispensing action from the nozzle after directing the emission of the notification.

18 Claims, 5 Drawing Sheets

LIQUID DISPENSER WITH PRECISE DISPENSATION USING A VOICE ASSISTANT

FIELD OF THE INVENTION

The present subject matter relates generally to refrigerator appliances, and more particularly to methods for dispensing precise amounts of liquid from a dispenser of a refrigerator appliance.

BACKGROUND OF THE INVENTION

Refrigerator appliances generally include one or more cabinets defining chambers for the receipt of food items for storage. Refrigerator appliances may also include features for dispensing ice and/or liquid water. To provide ice and/or liquid water, a dispenser is typically positioned on a door of the appliance. The user positions a container proximate the dispenser, and ice and/or liquid water are deposited into the container depending upon the user's selection. A paddle or other type switch may be provided whereby the user may make a selection. Typically, the liquid water is chilled by routing the liquid water through one of the refrigerated chambers.

Recently, refrigerator appliances have incorporated certain fill techniques to ensure a precise amount of liquid, such as water, is dispensed in a single dispensation. Such precise dispensations can be useful in certain cooking operations, food or meal preparations, water consumption tracking, or the like. However, current systems that incorporate such dispensations have several drawbacks. For instance, inputting a precise amount to be dispensed can be difficult or time consuming. Moreover, in the midst of certain preparation activities, users may not be properly equipped or able to enter the precise amount to be dispensed.

Accordingly, a refrigerator appliance that obviates one or more of the above-mentioned drawbacks would be beneficial. In particular, a dispenser capable to storing and implementing a precise dispense amount via a voice command would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet defining a chilled chamber, a dispenser provided on the cabinet, the dispenser defining a dispenser recess, the dispenser including a nozzle for dispensing liquid water or ice, a user input provided on the dispenser, and one or more controllers operably connected with the dispenser, the one or more controllers configured to perform an operation. The operation may include receiving a first input signal apart from the refrigerator appliance, the first input signal including a first requested volume of liquid, storing the first requested volume of liquid within the dispenser, directing an emission of a notification via the user input in response to storing the first requested volume of liquid, and initiating a dispensing action from the nozzle after directing the emission of the notification.

In another exemplary aspect of the present disclosure, a method of operating a refrigerator appliance is provided. The refrigerator appliance may include a dispenser defining a dispenser recess and a user input provided on the dispenser. The method may include receiving a first input signal apart from the refrigerator appliance, the first input signal including a first requested volume of liquid, storing the first requested volume within the dispenser, directing an emission of a notification via the user input in response to storing the first requested volume of liquid, and initiating a dispensing action from the dispenser after directing the emission of the notification.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
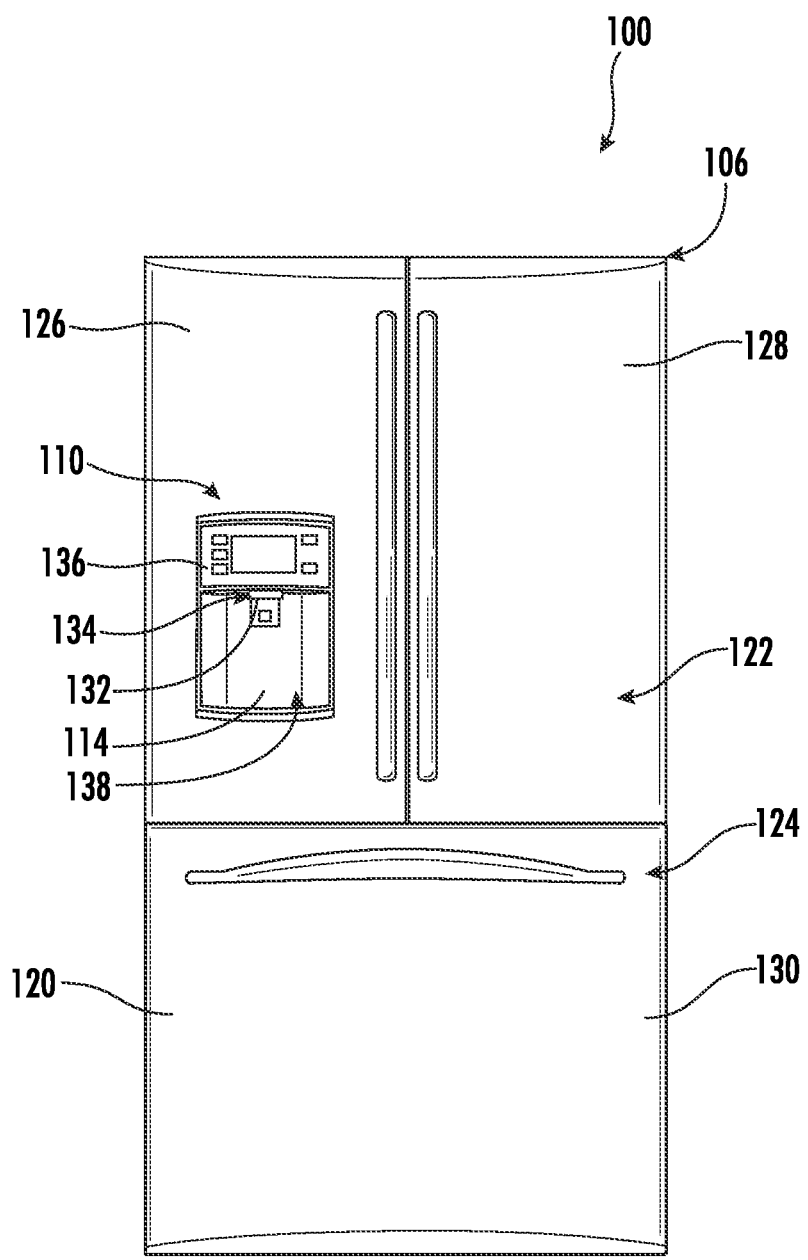
FIG. 1 provides a front, elevation view of a refrigerator appliance according to example embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, FIG. 1 depicts a front view of an example embodiment of a refrigerator appliance 100. Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom-mount refrigerator appliance. In the exemplary embodiment, housing 120 also defines a mechanical compartment (not shown) for receipt of a sealed cooling system. Using the teachings disclosed herein, one of skill in the art will understand that the present invention may be used with other types of refrigerator appliances (e.g., side-by-sides or top-mounts). Consequently, the description set forth herein is for illustrative purposes only and is not intended to limit the invention to any particular style of refrigerator appliance or arrangement of chilled chambers.

Refrigerator doors 126, 128 are rotatably hinged to an edge of housing 120 for accessing fresh food compartment 122. A freezer door 130 is arranged below refrigerator doors 126, 128 for accessing freezer chamber 124. In the exemplary embodiment, freezer door 130 is coupled to a freezer drawer (not shown) slidably mounted within freezer chamber 124.

Refrigerator appliance 100 includes a dispensing assembly 110 for dispensing liquid water and ice. Dispensing assembly 110 includes a dispenser 114 positioned on an exterior portion of refrigerator appliance 100. Dispenser 114 includes a discharging outlet 134 for accessing ice and liquid water. Dispensing assembly 110 further includes a sensor 112 positioned on discharging outlet 134. As will be described in more detail below, sensor 112 may be configured to detect a presence of a container positioned within dispensing assembly 110, and to detect the top lip of the container. A user interface panel 136 is provided for controlling the mode of operation. For example, user interface panel 136 includes a water dispensing button (not labeled) and an ice-dispensing button (not labeled) for selecting a desired mode of operation such as crushed, non-crushed ice, or liquid water, etc.

Discharging outlet 134 is an external part of dispenser 114, and is mounted in a dispensing recess or recessed portion 138 defined in an outside surface of refrigerator door 126. Recessed portion 138 is positioned at a predetermined elevation convenient for a user to access ice or liquid water and enabling the user to access ice or liquid water without the need to bend-over and without the need to access freezer chamber 124. In the exemplary embodiment, recessed portion 138 is positioned at a level that approximates the chest level of a user.

Figure 2:
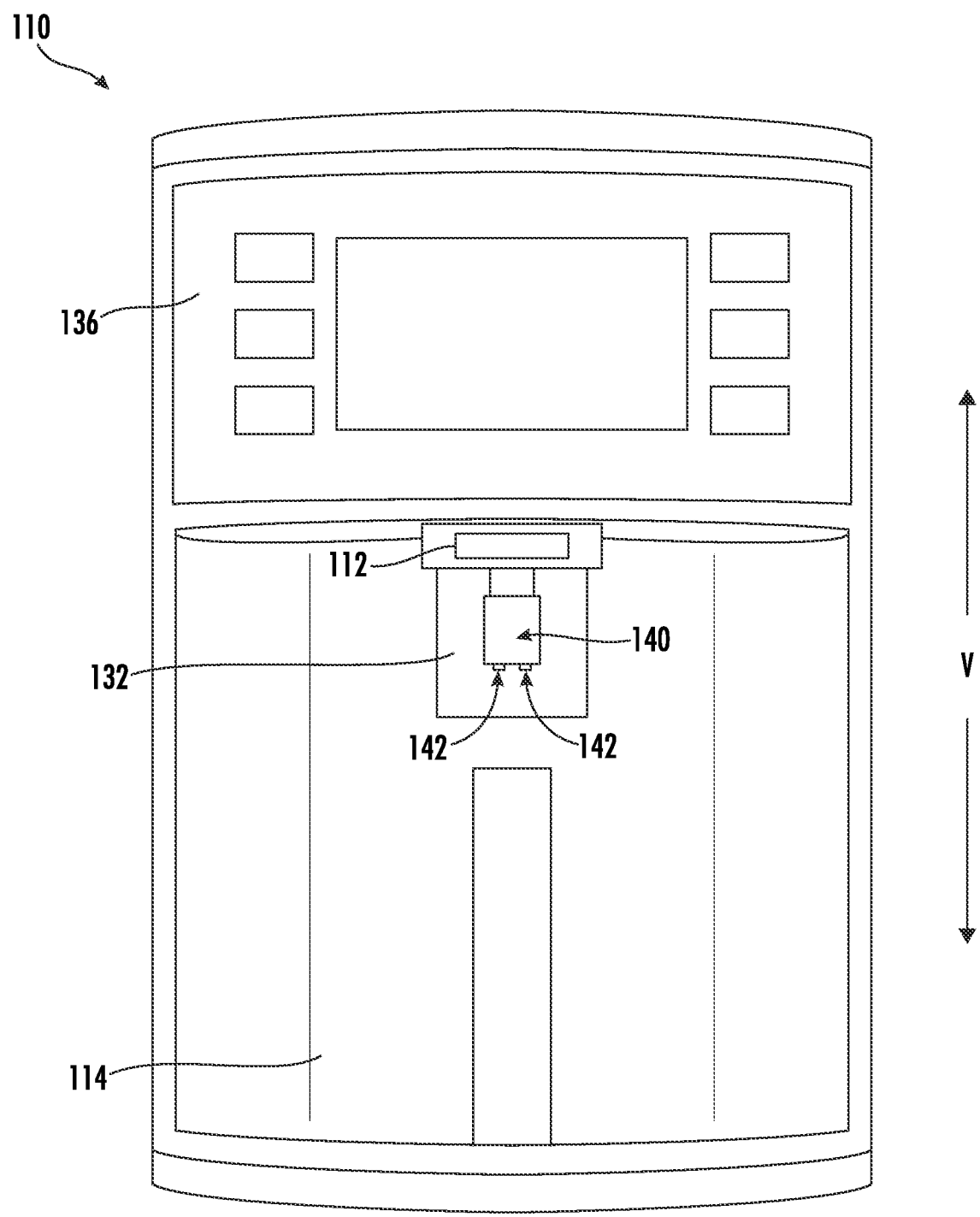
FIG. 2 provides a front, elevation view a dispensing assembly of the example refrigerator appliance of FIG. 1.

FIG. 2 provides a close-up front view of the dispenser 114 of dispensing assembly 110. An exemplary nozzle 140 is positioned adjacent to an activation member 132. For one example, activation member 132 is an activation paddle configured to be manipulated (e.g., by a receptacle or vessel to collect liquid from nozzle 140). Nozzle 140 includes a plurality of fluid outlets 142 through which liquid water may flow into a container placed into the recess 138 of dispensing assembly 110 by a user of appliance 100. Dispensing assembly 110 may further include a sensor, such as sensor 112. Sensor 112 may be positioned above nozzle 140 within dispenser 114. In particular, sensor 112 may be positioned within an upper portion of dispenser 114 such that one or more signals generated by sensor 112 are transmitted parallel to the liquid water stream. In this manner, sensor 112 may be positioned vertically above a container placed in dispenser 114.

In example embodiments, sensor 112 may be an ultrasonic transducer configured to periodically transmit and receive high frequency sound waves, and to convert the received sound waves into electrical data. In particular, sensor 112 may be configured to generate and transmit a sound wave, and to receive one or more echoed sound waves. Sensor 112 may further be configured to determine a time interval between transmitting the sound wave and receiving the one or more echoes. It will be appreciated that various other sensors and/or sensor configurations may be used, such as for instance, a sensor configuration including a separate and distinct transmitter and receiver. For instance, sensor 112 may be any suitable sensor, such as an infrared sensor, an optical sensor, a laser sensor, a capacitive sensor, or an inductive sensor, e.g., directed towards dispenser recess 138 of refrigerator appliance 100 for assisting operation of dispenser 114.

Figure 3:
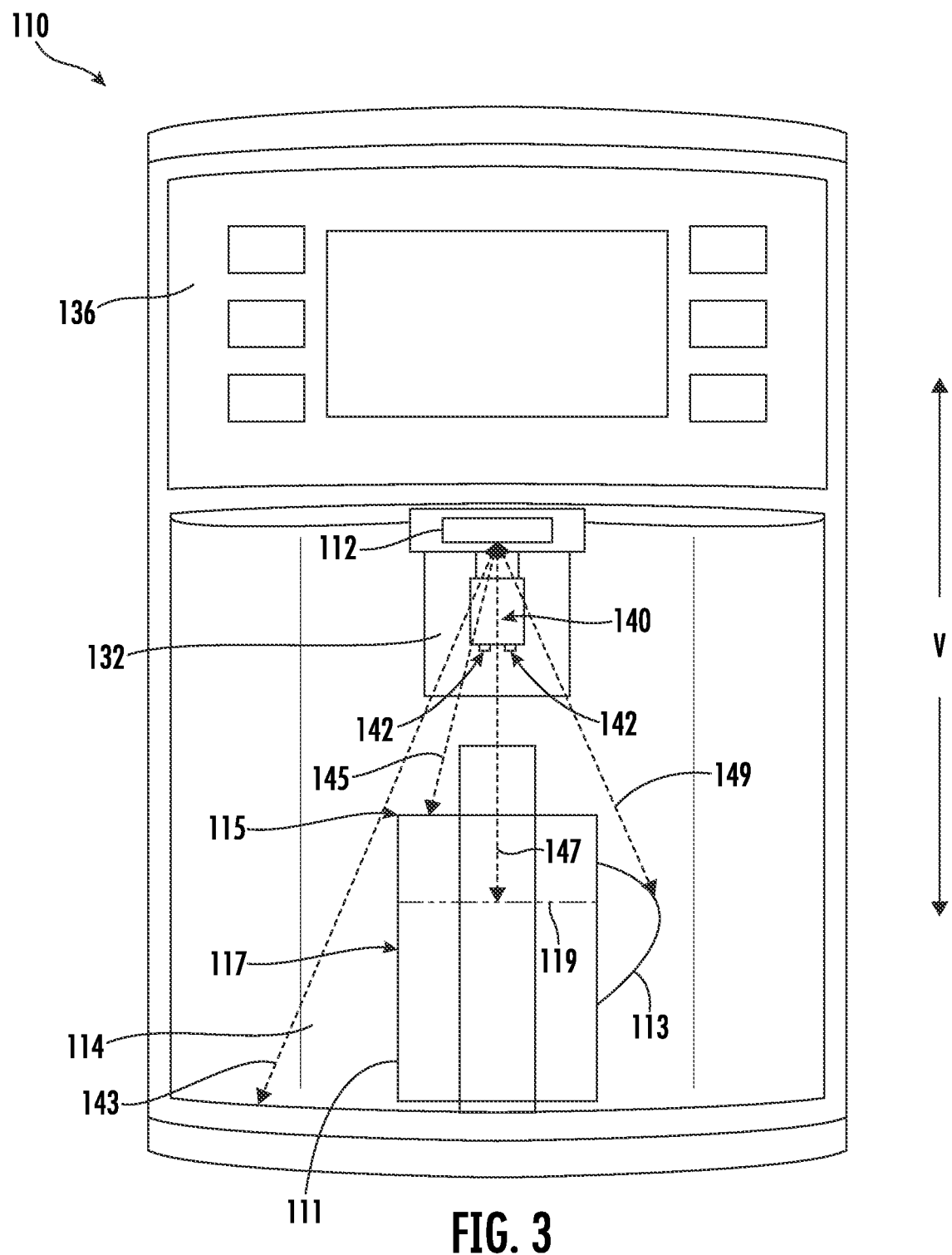
FIG. 3 provides a front, elevation view a dispensing assembly of the example refrigerator appliance of FIG. 1.

FIG. 3 provides a close-up front view of the dispenser 114 of dispensing assembly 110. In example embodiments, sensor 112 may be configured to detect a presence of a container 111 positioned proximate or within dispenser 114. For instance, sensor 112 may transmit one or more signals 143, 145, 147, 149 (e.g. sound waves), and receive one or more signals (e.g. reflected sound waves) indicative of container 111. In particular, the presence of a container may be detected at least in part by a comparison of a received signal with a baseline signal. The baseline signal may be a signal received by sensor 112 that is not reflected by a container. For instance, the baseline signal may be a signal transmitted by sensor 112 that is reflected, for instance, by a bottom surface of dispenser 114 (e.g., signal 143). Such signal may have an associated time interval corresponding to a particular known time interval (or range of time) for a signal transmitted by sensor 112 to return to sensor 112 in the absence of a container. When container 111 is positioned proximate dispenser 114, a different signal may be received corresponding at least in part to the signal reflected by container 111 (e.g., signal 145). Such signal may have a different corresponding time interval (or range of time), which may be indicative of the presence of container 111.

Figure 4:
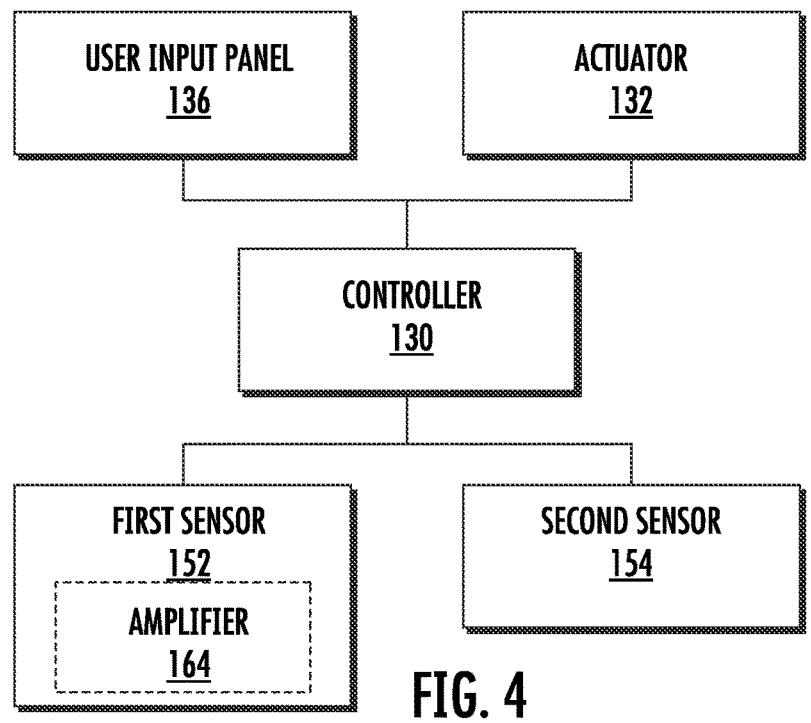
FIG. 4 provides a schematic view of the refrigerator appliance of FIG. 1.

FIG. 4 provides a schematic view of refrigerator appliance 100. As may be seen in FIG. 4, sensor 112 may include a first sensor 152 and a second sensor 154. According to at least one embodiment, each of first and second sensors 152 and 154 are ultrasonic sensors. First sensor 152 may be constructed in a similar manner to second sensor 154 and include an ultrasonic transducer and ultrasonic detector. Thus, first sensor 152 may operate in a similar manner to second sensor 154. First sensor 152 may be directed towards dispenser recess 138 (e.g., along a first direction) and second sensor 154 may be directed towards dispenser recess 138 along a second direction (e.g., different from the first direction). Each of first and second sensors 152 and 154 may be configured for detecting a container within dispenser recess 138. As an example, second sensor 154 can be mounted to dispenser 114, e.g., above (e.g., along the vertical direction V) dispenser recess 138 or adjacent discharging outlet 134. Second sensor 154 can be configured for detecting and/or locating a lip or a bottom of a container within dispenser recess 138. Second sensor 154 can also be configured for determining a height of contents within the container, e.g., relative to the lip or the bottom of the container.

Refrigerator appliance 100 further includes a controller 150. Operation of the refrigerator appliance 100 is regulated by controller 150 that is operatively coupled to user input panel 136. In one exemplary embodiment, user input panel 136 may represent a general purpose I/O ("GPIO") device or functional block. In another exemplary embodiment, user input panel 136 may include input components, such as one or more of a variety of electrical, mechanical or electro-mechanical input devices including rotary dials, push buttons, and touch pads. User input panel 136 may be in communication with controller 150 via one or more signal lines or shared communication busses.

User input panel (or user input) 136 provides selections for user manipulation of the operation of refrigerator appliance 100. In response to user manipulation of the user input panel 136, controller 150 operates various components of refrigerator appliance 100. For example, controller 150 is operatively coupled or in communication with actuator 132, first ultrasonic sensor 152, and second ultrasonic sensor 154, such that controller 150 can operate such components. In particular, controller 150 is in communication with first and second ultrasonic sensors 152 and 154 and may receive signals from such components. Controller 150 can receive such signals in order to detect or locate a container within dispenser recess 138 as discussed above.

Controller 150 includes memory and one or more processing devices such as microprocessors, CPUs or the like, such as general or special purpose microprocessors operable to execute programming instructions or micro-control code associated with operation of refrigerator appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

As may be seen in FIG. 4, first ultrasonic sensor 152 includes an amplifier 164. Amplifier 164 is configured for amplifying or adjusting signals, e.g., from first ultrasonic sensor 152 to controller 150. As an example, adjusting a gain of amplifier 164 can adjust a magnitude of signals from ultrasonic detector 162 of first ultrasonic sensor 152. In particular, increasing the gain of amplifier 164 can increase the magnitude of signals from ultrasonic detector 162 of first ultrasonic sensor 152. Conversely, decreasing the gain of amplifier 164 can decrease the magnitude of signals from ultrasonic detector 162 of first ultrasonic sensor 152. It should be understood that second ultrasonic sensor 154 can include a similar amplifier.

Figure 5:
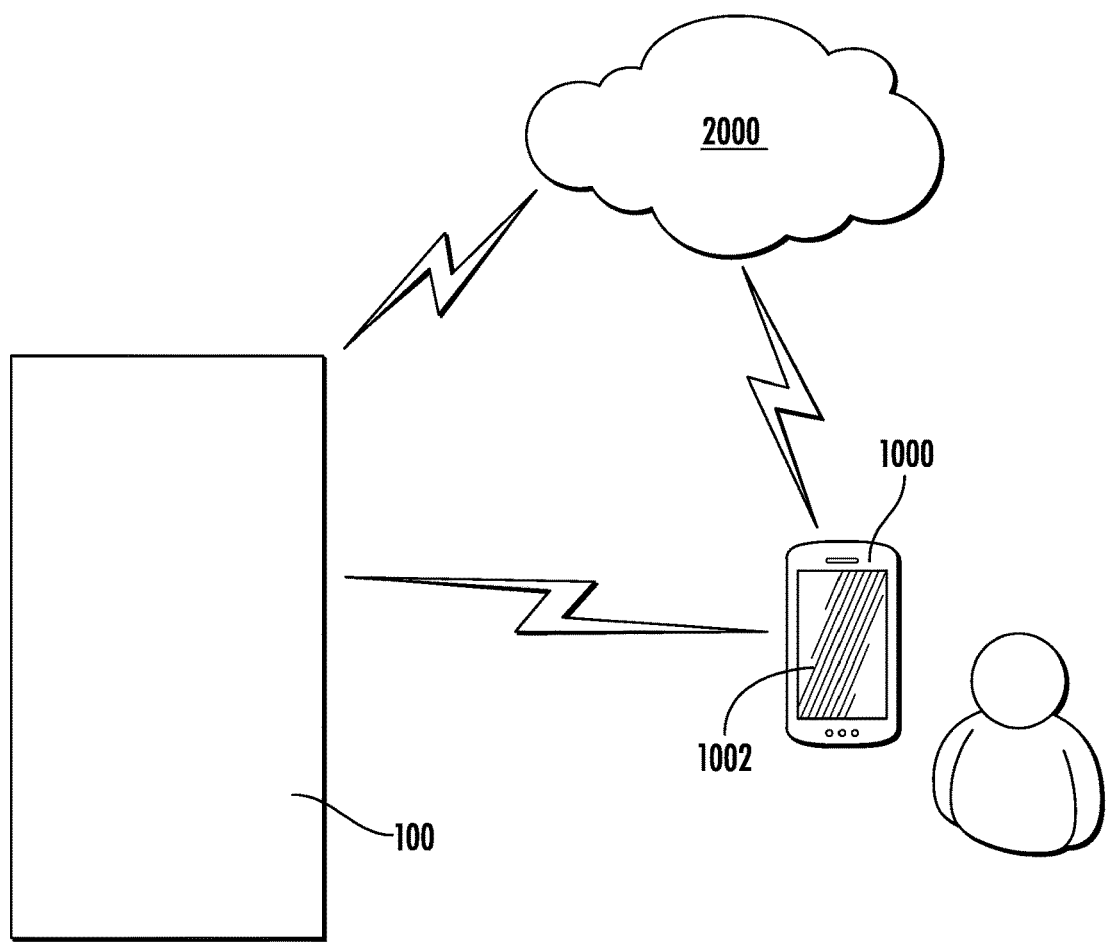
FIG. 5 provides a schematic illustration of an exemplary refrigerator appliance in communication with a remote user interface device according to one or more embodiments of the present disclosure.

FIG. 5 schematically illustrates the refrigerator appliance 100 communicating with a remote user interface device 1000. Also shown (but not numbered) in FIG. 5 is a user such as may interact with the remote user interface device 1000, e.g., via a user interface 1002 of the remote user interface such as a touchscreen in the illustrated embodiment. For example, the remote user interface device 1000 may be a device such as a cell phone, smart phone, smart assistant, or any similar device in operative communication with the controller 150 via a wireless connection. As shown in FIG. 5, the refrigerator appliance 100, and in particular, controller 150 thereof, may be configured to communicate with a separate device external to the appliance 100, such as a communications device or other remote user interface device 1000. The remote user interface device 1000 may be a laptop computer, smartphone, tablet, personal computer, wearable device, smart home system (such as a smart assistant speaker), or various other suitable devices. The refrigerator appliance 100 may include a network communication module, e.g., a wireless communication module, for communicating with the remote user interface device 1000. In various embodiments, a network communication module may include a network interface such that the controller 150 of the refrigerator appliance 100 can connect to and communicate over one or more networks with one or more network nodes. A network communication module may also include one or more transmitting, receiving, or transceiving components for transmitting/receiving communications with other devices communicatively coupled with refrigerator appliance 100. The network communication module may be in communication with, e.g., coupled or connected to, the controller 150 to transmit signals to and receive signals from the controller 150.

As schematically illustrated in FIG. 5, the refrigerator appliance 100 may be configured to communicate with the remote user interface device 1000 either directly or through a network 2000 (e.g., a smart home network). Thus, in various embodiments, the refrigerator appliance 100 and the remote user interface 1000 may be configured to communicate wirelessly with each other or with the network 2000. The network 2000 may be or include various possible communication connections and interfaces, e.g., such as Zigbee, BLUETOOTH®, WI-FI®, or any other suitable communication connection. The remote user interface device 1000 may include a memory for storing and retrieving programming instructions. For example, the remote user interface device 1000 may be a smartphone operable to store and run applications, also known as "apps," and may include a remote user interface provided as a smartphone app. Additionally or alternatively, multiple remote user interface devices 1000 may be connected with refrigerator appliance 100. For instance, one or more smart phones, one or more smart assistant devices (smart speakers), or the like may be simultaneously connected with refrigerator appliance 100 (e.g., through network 2000).

Figure 6:
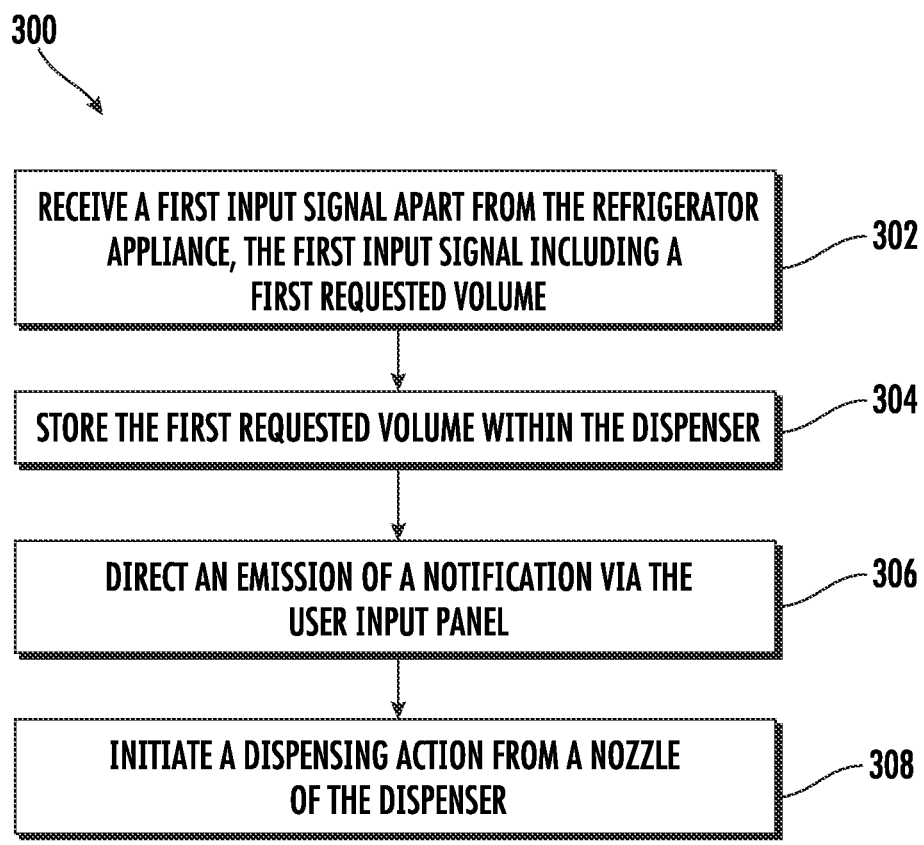
FIG. 6 provides a flow chart illustrating a method of operating a refrigerator appliance.

FIG. 6 depicts a flow diagram of an example method 300 of dispensing liquid water according to example embodiments of the present disclosure. Method 300 may be implemented by one or more computing devices (e.g., controllers such as controller 150). As an example, method 300 may be used in or with refrigerator appliance 100 to dispense liquid water. The controller 150 of refrigerator appliance 100 may be configured or programmed to implement method 300. In addition, FIG. 6 depicts steps performed in a particular order for purposes of illustration and discussion. Those of ordinary skill in the art, using the disclosures provided herein, will understand that the steps of any of the methods disclosed herein may be modified, adapted, expanded, omitted, and/or rearranged in various ways without deviating from the scope of the present disclosure.

At step 302, method 300 may include receiving a first input signal apart from the refrigerator appliance. The first input signal may include a first requested volume (e.g., a value of desired liquid volume). For instance, a user may provide an input signal (such as a voice input signal) including a request to set a dispensing amount to a predetermined volume (e.g., two cups of water). The first input signal may be provided (e.g., by the user) to a remote device provided separately from the refrigerator appliance. For one example, the input signal is a voice input signal to a smart speaker, a smart home assistant, or another smart device or software. Additionally or alternatively, the first input signal may be received by smart software installed within the refrigerator appliance (e.g., within a user interface). The first input signal (e.g., voice input signal) may be wirelessly transmitted from the remote device to one or more controllers within the refrigerator appliance via a wireless network connection. The first input signal may be encoded and transmitted as a data file, for example.

At step 304, method 300 may include storing the first requested volume within the dispenser. In detail, the one or more controllers of the refrigerator appliance may receive the voice input signal (e.g., from the remote device) including the requested volume. The one or more controllers may then determine the requested volume and store the requested volume on a memory within the dispenser of the refrigerator appliance. As mentioned above, the requested volume may be a predetermined volume or amount of liquid (e.g., water) to be dispensed in a single dispensation from the dispenser. Accordingly, the one or more controllers may store the requested volume as a command input to be performed by the dispenser at a future or subsequent dispensation.

At step 306, method 300 may include directing an emission of a notification via the user input panel. In detail, in response to storing the first requested volume, the one or more controllers may instruct the user input panel to perform a notification (e.g., a visual or audio notification). For instance, the user input panel may include one or more light emitting diodes (LEDs). Thus, the notification may include activating or illuminating at least one LED (e.g., according to a predetermined pattern). Additionally or alternatively, the user input panel may include a display screen. The notification may include displaying the requested volume on the display screen.

The notification may include an audio notification. For instance, the notification may include each of the visual notification (e.g., one or more LEDs) and an audio notification. The audio notification may include an audio output from a speaker (not shown) provided within the refrigerator appliance. For instance, the audio notification may include a chime, a buzz, a tone, a melody, or a voice output stating the requested amount. Accordingly, the notification may include a sequence of visual notifications and one or more audio notifications.

Further, at step 306, a notification may be sent (e.g., from the refrigerator appliance or from the remote device) to a second remote device registered to a user (e.g., a personal mobile phone, tablet, smart wearable, etc.). For instance, the one or more controllers may push an alert to a mobile application (app) of the second remote device notifying the user that the requested volume has been recognized and stored within the dispenser. Thus, the user may visually (and/or audially) confirm that the requested volume has been stored within the dispenser (e.g., via the user input panel, the second remote device, or both).

At step 308, method 300 may include initiating a dispensing action from a nozzle of the dispenser. In detail, the dispenser may receive instruction to perform the dispensing action after directing the emission of the notification. The instruction may be a second input signal. For instance, the user may input the second input signal at the dispenser. According to one embodiment, the second input signal includes a manipulation of an activation paddle (e.g., activation paddle 132). In detail, the user may place a container against the activation paddle to initiate the dispensing action, as would be understood. The dispenser may then begin dispensing the requested volume of liquid. Upon reaching the requested predetermined volume, the dispenser may automatically cease the dispensation of the liquid. For instance, the activation paddle may remain in the manipulated or activated position while the dispensation is ceased. Accordingly, only the requested predetermined amount of liquid is dispensed regardless of the state of the activation paddle (e.g., after the first activation or manipulation).

According to another embodiment, the second input signal includes an interaction, such as a button press, with or on the user input panel. In detail, the user may press (e.g., touch) an input (e.g., button, sensor, switch, etc.) on the user input panel to initiate the dispensing action. At this point, the dispenser may activate one or more sensors provided at the dispenser to detect or determine the presence of a container under the nozzle. As mentioned above, the one or more sensors may detect the container and transmit one or more detection signals to the one or more controllers. The one or more controllers may then determine a volume capacity of the detected container (e.g., in response to receiving the second input signal). For instance, the controller may, through analysis of the detection signals, determine an approximate size (e.g., height, radius, width, etc.) of the container and calculate the volume capacity.

Subsequently, the one or more controllers may determine whether the volume capacity of the container is greater than or equal to the requested volume stored within the dispenser. In detail, when the volume capacity is determined to be greater than or equal to the requested volume, the dispenser may automatically perform the dispensing action. When the volume capacity is determined to be less than the requested volume, the refrigerator appliance may emit an alert (e.g., via the dispenser or the user input panel). For instance, the one or more controllers may direct the user input panel to emit an audio alert (e.g., a chime, a buzz, a tone, a melody, or a voice output indicating the determination of the volume capacity). Additionally or alternatively, the one or more controllers may direct the user input panel to emit a visual alert (e.g., a predetermined pattern of one or more LEDs, a message on the display screen, etc.). Moreover, the controller may not automatically initiate the dispensing action. For instance, the emission of the requested volume of liquid may be contingent on determining that the volume capacity of the container is greater than or equal to the requested volume.

However, according to some embodiments, the controller determines the maximum volume capacity of the container as compared to the requested volume of liquid. When the maximum volume capacity of the container is less than the requested volume of liquid, the controller may initiate the dispensing action. Thereafter, the controller may automatically stop the dispensing action when the maximum volume capacity of the container has been dispensed (e.g., despite being less than the requested volume of liquid). Additionally or alternatively, the controller may emit a tone or alert that the volume of liquid dispensed is less than the requested volume. Thus the dispensing action may be automatically stopped before dispensing the requested volume and before overfilling the container.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
    a cabinet defining a chilled chamber;
    a dispenser provided on the cabinet, the dispenser defining a dispenser recess, the dispenser comprising a nozzle for dispensing liquid water or ice;
    a user input provided on the dispenser;
    a first sensor disposed vertically above the dispensing recess, the first sensor configured to receive one or more signals at a first direction indicative of a presence of a container proximate the dispensing recess;
    a second sensor disposed proximate the first sensor vertically above the dispensing recess, the second sensor configured to receive one or more signals at a second direction different from the first direction, wherein the one or more signals receive by the second sensor are indicate of a presence of the container proximate the dispensing recess; and
    one or more controllers operably connected with the dispenser, the one or more controllers configured to perform an operation, the operation comprising
        receiving a first input signal apart from the refrigerator appliance, the first input signal comprising a first requested volume of liquid;
        storing the first requested volume of liquid within the dispenser;
        directing an emission of a notification via the user input in response to storing the first requested volume of liquid; and
        initiating a dispensing action from the nozzle after directing the emission of the notification.

2. The refrigerator appliance of claim 1, wherein the first input signal comprises a voice input signal received at a remote device and transmitted to the one or more controllers via a connected network.

3. The refrigerator appliance of claim 2, wherein the remote device is a smart speaker.

4. The refrigerator appliance of claim 1, wherein the operation further comprises: receiving a second input signal via the dispenser prior to initiating the dispensing action.

5. The refrigerator appliance of claim 4, wherein the dispenser comprises an activation paddle provided within the dispenser recess, and wherein receiving the second input signal comprises determining that the activation paddle has been manipulated.

6. The refrigerator appliance of claim 5, wherein the operation further comprises:
    initiating the dispensing action upon receiving the second input signal; and
    stopping the dispensing action after dispensing the first requested volume of liquid.

7. The refrigerator appliance of claim 4, wherein receiving the second input signal comprises determining that an input on the user input has been pressed.

8. The refrigerator appliance of claim 1, wherein the operation further comprises:
    determining, via the first sensor disposed vertically above the dispensing recess and a second sensor, a volume capacity of the container proximate the dispensing recess in response to receiving the second input signal;
    determining that the volume capacity of the container is less than the first requested volume of liquid; and
    dispensing a volume of liquid that is less than or equal to the volume capacity of the container, wherein initiating the dispensing action is contingent on determining the volume capacity of the container.

9. The refrigerator appliance of claim 1, wherein emitting the notification via the user input comprises activating one or more indicators on the user input according to a predetermined pattern.

10. A method of operating a refrigerator appliance, the refrigerator appliance comprising a dispenser defining a dispenser recess and a user input provided on the dispenser, the method comprising:
    receiving a first input signal apart from the refrigerator appliance, the first input signal comprising a first requested volume of liquid;
    determining, via a first sensor directed at a first direction vertically above the dispenser recess and via a second sensor directed at a second direction, different from the first direction, vertically above the dispenser recess, a presence of a container proximate the dispensing recess;
    storing the first requested volume within the dispenser;
    directing an emission of a notification via the user input in response to storing the first requested volume of liquid; and
    initiating a dispensing action from the dispenser after directing the emission of the notification based on determining the container is present within the dispenser recess.

11. The method of claim 10, wherein the first input signal comprises a voice input signal received at a remote device and transmitted to the refrigerator appliance via a connected network.

12. The method of claim 11, wherein the remote device is a smart speaker.

13. The method of claim 10, further comprising:
receiving a second input signal via the dispenser to perform the dispensing action.

14. The method of claim 13, wherein the dispenser comprises an activation paddle provided within the dispenser recess, and wherein receiving the second input signal comprises determining that the activation paddle has been manipulated.

15. The method of claim 14, further comprising:
initiating the dispensing action upon receiving the second input signal; and
stopping the dispensing action after dispensing the first requested volume of liquid.

16. The method of claim 13, wherein receiving the second input signal comprises determining that an input on the user input has been pressed.

17. The method of claim 10, further comprising:
determining, via the first sensor and the second sensor, a volume capacity of the container proximate the dispensing recess in response to receiving the second input signal;
determining that the volume capacity of the container is greater than or equal to the first requested volume of liquid, wherein initiating the dispensing action is contingent on determining that the volume capacity of the container is greater than or equal to the first requested volume of liquid.

18. The method of claim 10, wherein emitting the notification via the user input comprises activating one or more indicators on the user input according to a predetermined pattern.

* * * * *